United States Patent
Takahashi et al.

(10) Patent No.: US 10,661,463 B2
(45) Date of Patent: May 26, 2020

(54) RESIN PELLETIZER APPARATUS AND ABNORMALITY DETERMINATION METHOD FOR RESIN PELLETIZER APPARATUS

(71) Applicant: Kobe Steel, Ltd., Kobe-shi (JP)

(72) Inventors: Eiji Takahashi, Kobe (JP); Ryo Tabuse, Kobe (JP); Kaname Araki, Kobe (JP); Chitaka Manabe, Kobe (JP); Shin Iwasaki, Takasago (JP); Tatsuru Miyamoto, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 16/098,957

(22) PCT Filed: May 16, 2017

(86) PCT No.: PCT/JP2017/018367
§ 371 (c)(1),
(2) Date: Nov. 5, 2018

(87) PCT Pub. No.: WO2017/212881
PCT Pub. Date: Dec. 14, 2017

(65) Prior Publication Data
US 2019/0184590 A1 Jun. 20, 2019

(30) Foreign Application Priority Data
Jun. 10, 2016 (JP) .................................. 2016-116313

(51) Int. Cl.
*B26D 1/28* (2006.01)
*B29B 9/06* (2006.01)
(Continued)

(52) U.S. Cl.
CPC ................. *B26D 1/28* (2013.01); *B26D 5/00* (2013.01); *B26D 5/26* (2013.01); *B29B 9/06* (2013.01); *B29B 9/065* (2013.01)

(58) Field of Classification Search
CPC .. B29B 9/06; B29B 9/065; B26D 1/28; B26D 5/00; B26D 5/26
See application file for complete search history.

(56) References Cited

U.S. PATENT DOCUMENTS 5,330,340 A * 7/1994 Suppon ................ B26D 7/2628
425/142
5,566,092 A 10/1996 Wang et al.
(Continued)

FOREIGN PATENT DOCUMENTS

EP 1 548 419 61 7/2013
JP 9-189644 A 7/1997
(Continued)

OTHER PUBLICATIONS

International Preliminary Report on Patentability and Written Opinion dated Dec. 20, 2018 in PCT/JP2017/018367, English translation only.
(Continued)

*Primary Examiner* — Xiao S Zhao
*Assistant Examiner* — Joseph S Leyson
(74) *Attorney, Agent, or Firm* — Oblon, McClelland, Maier & Neustadt, L.L.P.

(57) ABSTRACT

A resin pelletizer apparatus (100) is provided with: a die (6) that has a die surface (61) having a die hole (63) formed therein; a rotary blade (21) that cuts a resin extruded from the die hole (63) into a pellet shape in water when being rotated on the die surface (61) in the water; a sensor (150) that detects elastic waves generated by the rotary blade (21) during the rotation on the die surface (61); and a determi-
(Continued)

nation unit (121) that monitors the output value of the sensor (150) and determines that an abnormality has occurred when the output value of the sensor (150) is outside a predetermined range (R).

5 Claims, 13 Drawing Sheets

(51) Int. Cl.
*B26D 5/26* (2006.01)
*B26D 5/00* (2006.01)

(56) References Cited

U.S. PATENT DOCUMENTS

| | | | |
|---|---|---|---|
| 6,392,584 | B1 | 5/2002 | Eklund |
| 7,933,742 | B2 | 4/2011 | Ishii et al. |
| 10,160,153 | B2 * | 12/2018 | Tabuse .................. G01N 29/04 |
| 2008/0299243 | A1 * | 12/2008 | Pinchot .................. B29B 9/06 425/142 |
| 2010/0109177 | A1 * | 5/2010 | Garbe .................. B29B 9/06 264/5 |
| 2010/0143520 | A1 * | 6/2010 | Pinchot .................. A23N 17/005 425/142 |

FOREIGN PATENT DOCUMENTS

| | | |
|---|---|---|
| JP | 2001-21453 A | 1/2001 |
| JP | 2001-38676 A | 2/2001 |
| JP | 2003-211442 A | 7/2003 |
| JP | 2009-6576 A | 1/2009 |
| JP | 2010-179530 A | 8/2010 |
| JP | 2010-201864 A | 9/2010 |

OTHER PUBLICATIONS

International Search Report dated Aug. 1, 2017 in PCT/JP2017/018367 filed May 16, 2017.
Extended European Search Report dated Oct. 25, 2019 in Patent Application No. 17810062.4.

* cited by examiner

RESIN PELLETIZER APPARATUS AND ABNORMALITY DETERMINATION METHOD FOR RESIN PELLETIZER APPARATUS

TECHNICAL FIELD

The present invention relates to a technique of shaping a resin into a pellet form.

BACKGROUND ART

A resin pelletizer apparatus is an apparatus such that, with use of rotary blades that rotate at a high speed on a die surface having die holes formed therein, a molten resin having a strand shape (string shape) extruded from the die holes into water is cut, whereby the resin is shaped into a pellet form.

In the resin pelletizer apparatus, poor cutting of the molten resin may occur. The poor cutting refers to a phenomenon in which, for example, a pellet having a whisker-shaped portion is generated, or a plurality of pellets connected in a chain form are generated.

In order to prevent poor cutting, the following technique, for example, is proposed. Patent Literature 1 discloses a poor cutting detection method including a step of measuring the position of a cutter knife by allowing the cutter knife to abut against the die surface at each timing of standard position setting and setting the measured position as a standard position, a step of measuring the position of the cutter knife while rotating the cutter knife to cut the molten resin and setting the measured position as a current position, and a step of notifying a user of the occurrence of poor cutting with an alarm when a difference between the current position and the standard position becomes larger than a predetermined set value of clearance.

Patent Literature 2 discloses a method of detecting a molten resin pressure in the inside of the die to change a bias value and controlling the pressing force of a cutter driving shaft. According to this method, an optimal cutting operation can be obtained in accordance with the change in the molten resin pressure.

Development of a further technique that can prevent poor cutting is demanded.

CITATION LIST

Patent Literature

Patent Literature 1: Japanese Unexamined Patent Publication No. 2001-38676
Patent Literature 2: Japanese Unexamined Patent Publication No. 2009-6576

SUMMARY OF INVENTION

An object of the present invention is to provide a resin pelletizer apparatus and an abnormality determination method for a resin pelletizer apparatus that can determine that an abnormality giving rise to a cause of poor cutting has occurred.

A resin pelletizer apparatus according to the first aspect of the present invention includes a die that has a die surface having a die hole formed therein; a rotary blade that cuts a resin extruded from the die hole into a pellet shape in water when being rotated on the die surface in the water; a sensor that detects elastic waves generated by the rotary blade during rotation on the die surface; and a determination unit that monitors an output value of the sensor and determines that an abnormality has occurred when the output value of the sensor is outside a predetermined range.

The foregoing and other objects, features, and advantages of the present invention will be apparent from the following detailed description and the attached drawings.

BRIEF DESCRIPTION OF DRAWINGS

FIG. 2 is viewed in the direction of IIIa-IIIb.

FIG. 2 is viewed in the direction of IVa-IVb.

FIG. 2 is viewed in the direction of Va-Vb.

DESCRIPTION OF EMBODIMENTS

Figure 1:
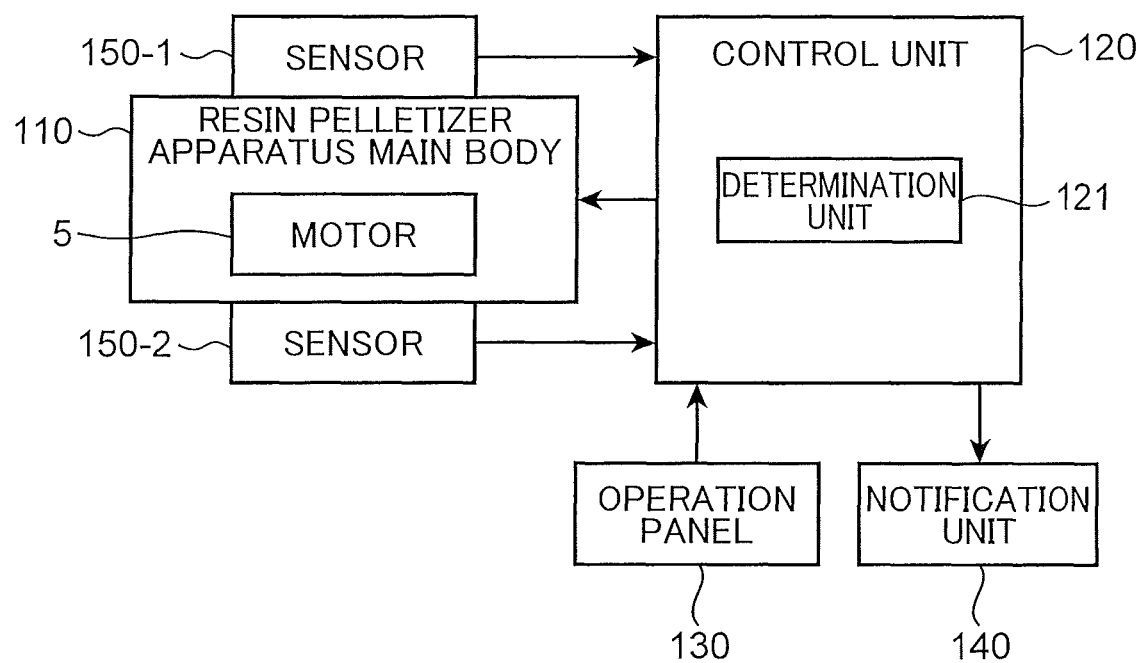
FIG. 1 is a block diagram showing a configuration of a resin pelletizer apparatus according to the present embodiment.

Hereafter, embodiments of the present invention will be described in detail with reference to the drawings. In each of the drawings, constituent elements denoted with the same reference sign are the same, and the description thereof with respect to the already described contents will be omitted. In the present specification, when constituent elements are comprehensively referred to, the elements will be denoted with reference signs without including suffixes, whereas when the constituent elements are individually referred to, the elements will be denoted with reference signs with suffixes. FIG. 1 is a block diagram showing a configuration of a resin pelletizer apparatus 100 according to the present embodiment. The resin pelletizer apparatus 100 is provided with a resin pelletizer apparatus main body 110, a control unit 120, an operation panel 130, a notification unit 140, and two sensors 150.

Figure 2:
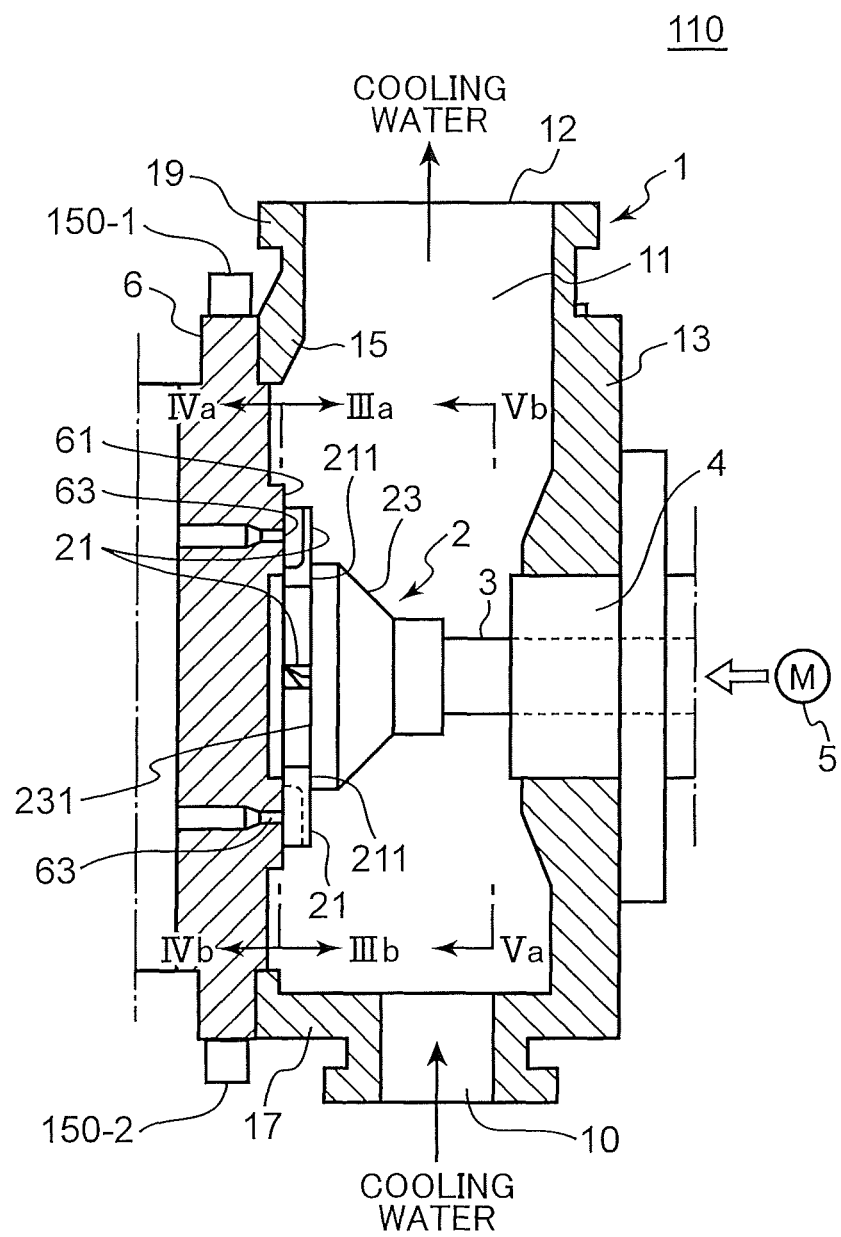
FIG. 2 is a sectional view of a resin pelletizer apparatus main body.
Figure 3:
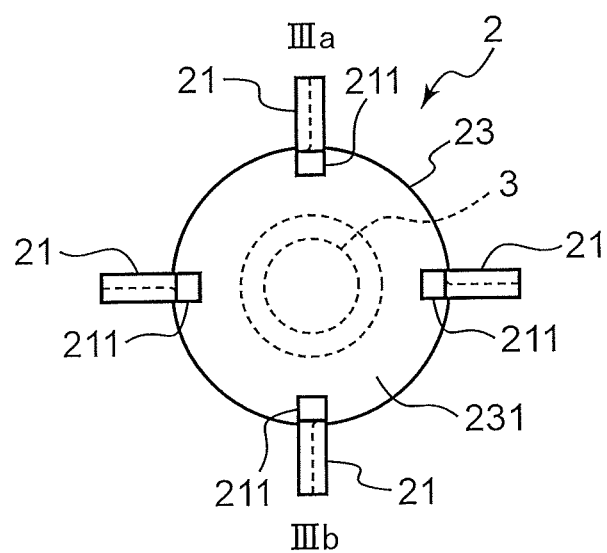
FIG. 3 is a plan view when
Figure 4:
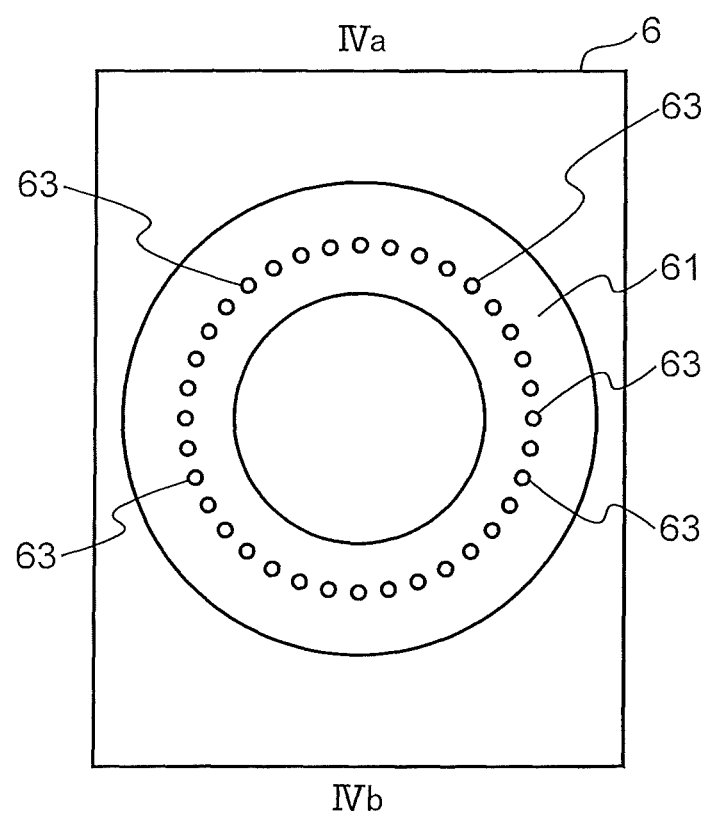
FIG. 4 is a plan view when
Figure 5:
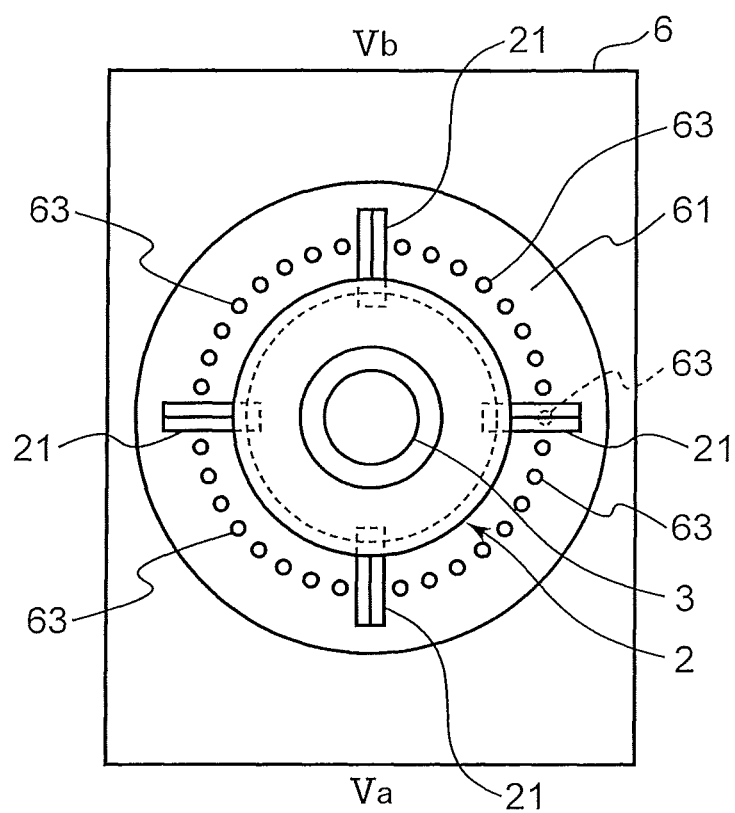
FIG. 5 is a plan view when

First, the resin pelletizer apparatus main body 110 will be described. FIG. 2 is a sectional view of the resin pelletizer apparatus main body 110. FIG. 3 is a plan view when FIG. 2 is viewed in the direction of IIIa-IIIb. FIG. 4 is a plan view when FIG. 2 is viewed in the direction of IVa-IVb. FIG. 5 is a plan view when FIG. 2 is viewed in the direction of Va-Vb.

Referring to FIG. 2, the resin pelletizer apparatus main body 110 is provided with a chamber 1, a rotation head 2, a rotation shaft 3, a shaft bearing 4, a motor 5, and a die 6. The rotation head 2 is disposed in an inside 11 of the chamber 1. The rotation head 2 is fixed to one end of the rotation shaft 3. A through-hole is formed in a wall surface 13 of the chamber 1 that intersects with the rotation shaft 3, and the shaft bearing 4 is inserted and fitted into the through-hole. The shaft bearing 4 supports the rotation shaft 3. The other end of the rotation shaft 3 extends to an outside of the chamber 1 and is connected to the motor 5. When the motor 5 rotates, the rotation shaft 3 rotates, whereby the rotation head 2 is rotated.

With reference to FIGS. 2 and 3, the rotation head 2 includes four rotary blades 21 and a fixation unit 23 to which each rotary blade 21 is fixed. The fixation unit 23 has a circular cone frustum shape, and the rotation shaft 3 is fixed to one end surface of the fixation unit 23. The four rotary blades 21 are arranged at an interval of 90 degrees on the other end surface of the fixation unit 23 (bottom surface 231 of the circular cone frustum). Description will be given on an example in which the number of the rotary blades 21 is four; however, the number of the rotary blades 21 is not limited to four.

Each rotary blade 21 has a generally rectangular shape, and the longitudinal direction of the rotary blade 21 is directed in the radial direction of the other end surface of the fixation unit 23 (bottom surface 231 of the circular cone frustum). One end 211 of the rotary blade 21 is fixed to an edge of the other end surface of the fixation unit 23 (bottom surface 231 of the circular cone frustum), and the rotary blade 21 rotates on the outside of the other end surface of the fixation unit 23 (bottom surface 231 of the circular cone frustum).

A through-hole is formed in a wall surface 15 of the chamber 1 that opposes the other end surface of the fixation unit 23 (bottom surface 231 of the circular cone frustum). This through-hole is occupied by the die 6.

With reference to FIGS. 2 and 4, the die 6 has a die surface 61 that is disposed in an inside 11 of the chamber 1. The die surface 61 has a circular disk shape and has a plurality of die holes 63 formed therein at an equal interval in a ring shape. The die holes 63 penetrate through the die 6. With reference to FIGS. 2 and 5, the die holes 63 are opened to a passageway where the rotary blades 21 rotate, and a molten resin extruded from an extruder (not illustrated in the drawings) passes through the die holes 63 to be extruded from the die holes 63 and is cut by the rotary blades 21 on the die surface 61. This allows the molten resin to be shaped into a pellet form.

With reference to FIG. 2, while the resin pelletizer apparatus 100 is in operation, the inside 11 of the chamber 1 is filled with water, so that the rotation head 2, the die surface 61, and the die holes 63 are in water. The pellets are cooled by the water in the inside 11 of the chamber 1. At a lower part of the chamber 1, a through-hole constituting a flow inlet 10 is formed in a wall surface 17 of the chamber 1. At an upper part of the chamber 1, a through-hole constituting a flow outlet 12 is formed in a wall surface 19 of the chamber 1. Water is sent through the flow inlet 10 into the inside 11 of the chamber 1, and the inside 11 is filled with water. The water in the inside 11 is guided through the flow outlet 12 to the outside of the chamber 1 so as to be sent again through the flow inlet 10 into the inside 11 of the chamber 1.

While the resin pelletizer apparatus 100 is in operation, in a state in which the inside 11 of the chamber 1 is filled with water, a driving force from the motor 5 is transmitted to the rotation head 2 via the rotation shaft 3, so as to rotate the rotation head 2 at a high speed. This allows the rotary blades 21 to rotate at a high speed on the die surface 61. The molten resin extruded from the extruder (not illustrated in the drawings) passes through the die holes 63 to be extruded from the die holes 63 and is cut by the rotary blades 21 to be shaped into pellets.

With reference to FIG. 1, the control unit 120 will be described. The control unit 120 controls the resin pelletizer apparatus main body 110. The control unit 120 is a computer realized by a CPU (Central Processing Unit), a RAM (Random Access Memory), a ROM (Read Only Memory), and others. The control unit 120 includes a determination unit 121 as a functional block. This functional block will be described later.

The operation panel 130 is a device by which an input for operation of the resin pelletizer apparatus 100 is made. This input includes a command for start of the operation of the resin pelletizer apparatus 100, a command for stoppage of the operation, and the like.

The notification unit 140 notifies a user of the occurrence of abnormality with an alarm when it is determined by the determination unit 121 that an abnormality has occurred during the operation of the resin pelletizer apparatus 100. The notification unit 140 is realized by a display, a speaker, an alarming lamp, or the like. When the notification unit 140 is a display, an image showing that the abnormality has occurred is displayed. When the notification unit 140 is a speaker, a sound telling that the abnormality has occurred is output. When the notification unit 140 is an alarming lamp, the alarming lamp is lit.

With reference to FIGS. 1 and 2, two sensors 150-1, 150-2 are disposed to be spaced apart from each other on a side surface of the die 6. When viewed from the die surface 61, the sensor 150-2 is located at a position rotated by about 180 degrees from the position of the sensor 150-1. While the resin pelletizer apparatus 100 is in operation, the rotary blades 21 rotate at a high speed on the die surface 61 in a state in which the rotary blades 21 are in contact with the die surface 61, so that elastic waves are generated. The sensor 150 detects the elastic waves.

When supersonic waves generated by the rotary blades 21 during the rotation on the die surface 61 are detected as the elastic waves, an AE (Acoustic Emission) sensor is used. When a vibration generated by the rotary blades 21 during the rotation on the die surface 61 is detected as the elastic waves, a vibration sensor is used. In the present embodiment, description will be giving by raising an AE sensor as an example of the sensor 150. An output value of the sensor 150 is an intensity of the signals that are output from the sensor 150 and indicates the magnitude of the supersonic waves generated by the rotary blades 21 during the rotation on the die surface 61. The output value of the sensor 150 is preferably a root mean square (RMS (root mean square) value) of the signals that are output from the sensor 150.

As described above, the resin pelletizer apparatus 100 cuts the molten resin in water by rotating the rotary blades 21 at a high speed on the die surface 61 in a state in which the rotary blades 21 are in contact with the die surface 61. Poor cutting occurs in the following four cases.

(1) The contact surface pressure between the rotary blades 21 and the die surface 61 is too large.

(2) The rotation shaft 3 is tilted.

(3) Abrasion of the rotary blades 21 or the die surface 61 is in progress.

(4) Cavitation has occurred.

The contact surface pressure is a pressure by which the rotary blades 21 are pressed onto the die surface 61. The case (2) is, in other words, a state in which the rotation shaft 3 is not perpendicular to the die surface 61. The cavitation is a physical phenomenon in which generation and disappearance of bubbles occur in a short period of time due to the pressure difference in the flow of liquid.

By conducting the following experiments 1 to 3, the present inventors have found out that the above four types of abnormality can be determined on the basis of the output value of the sensor 150.

Figure 6:
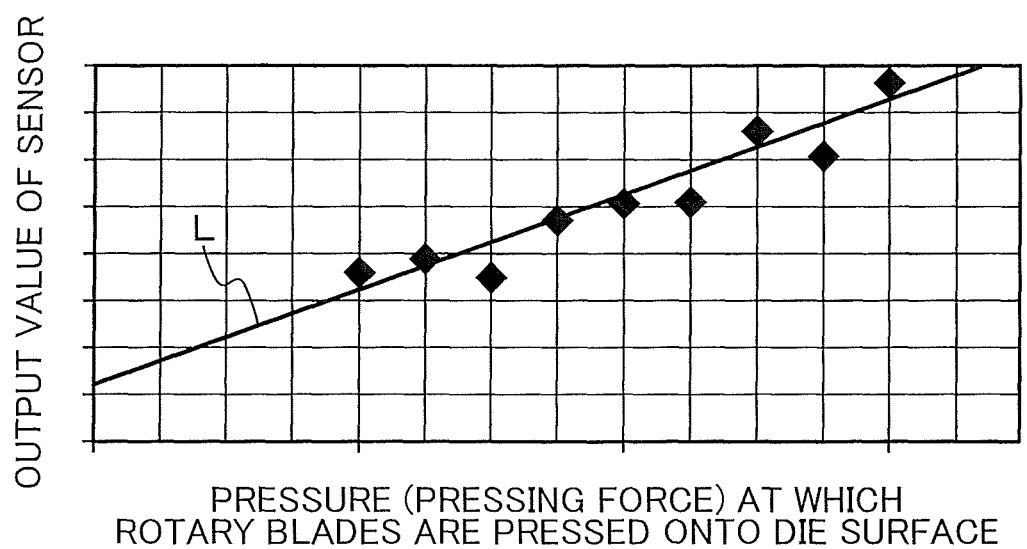
FIG. 6 is a graph showing a relationship between the force at which rotary blades are pressed onto a die surface and the output value of a sensor.

The experiment 1 will be described. The present inventors conducted an experiment of measuring the output value of the sensor 150 while changing the pressure by which the rotary blades 21 are pressed onto the die surface 61 (This pressure may also be referred to as "pressing force"). FIG. 6 is a graph in which the experiment results are plotted. The lateral axis of the graph represents the pressing force, and the longitudinal axis represents the output value of the sensor 150. An experiment result of one of the two sensors 150 is plotted, and plotting of the experiment result of the other one is omitted. The straight line L is a regression line of the experiment result.

When the pressing force increases, the output value of the sensor 150 increases, whereas when the pressing force decreases, the output value of the sensor 150 decreases. From this, it will be understood that the output value of the sensor 150 is correlated to the pressing force (contact surface pressure between the rotary blades 21 and the die surface 61), and that the case in which the contact surface pressure is too large can be determined on the basis of the output value of the sensor 150.

When the contact surface pressure is too small, a clearance (gap) is generated between the rotary blades 21 and the die surface 61, whereby poor cutting occurs. When abrasion of at least one of the rotary blades 21 and the die surface 61 proceeds, the contact surface pressure between these decreases. Accordingly, it will be understood that the determination of the progress of abrasion can be made on the basis of the output value of the sensor 150.

Figure 7:
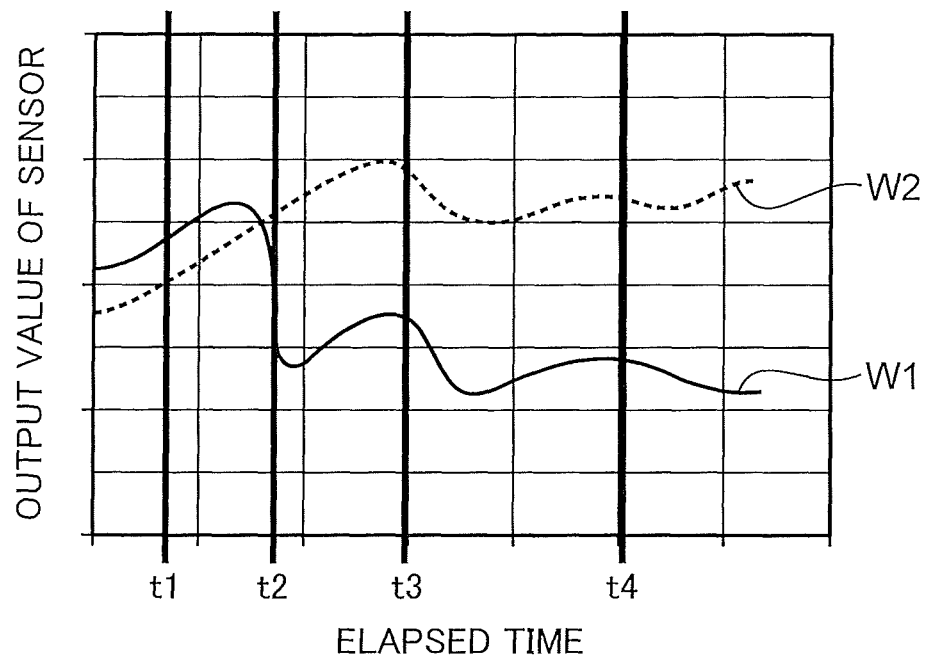
FIG. 7 is a graph showing a relationship between the elapsed time and the output value of a sensor when the die is gradually tilted.

The experiment 2 will be described. The present inventors conducted an experiment of measuring the output value of the sensor 150 while changing the inclination of the die 6. FIG. 7 is a graph showing an output waveform W1 of the sensor 150-1 and an output waveform W2 of the sensor 150-2 in this experiment. The lateral axis of the graph represents the elapsed time, and the longitudinal axis represents the output value of the sensor 150. The elapsed time is a period of time that has elapsed from the start of measurement of the output value.

The inclination of the die 6 is regarded as the inclination of the rotation shaft 3. Among a plurality of bolts that fix the die 6, the bolt located at a position close to the sensor 150-1 was loosened a little at the time point t1, further loosened a little at the time point t2, further loosened a little at the time point t3, and further loosened a little at the time point t4. This realizes a state in which the die 6 gradually becomes tilted. It has been found out that, when the die 6 is tilted (when the rotation shaft 3 is tilted), the output value of the sensor 150-1 (sensor 150 located at a position close to the loosened bolt) gradually decreases, whereas the output value of the sensor 150-2 (sensor 150 located at a position away from the loosened bolt) gradually increases. Accordingly, it will be understood that the determination of the case in which the rotation shaft 3 is tilted can be made on the basis of the output values of the sensors 150.

Figure 8:
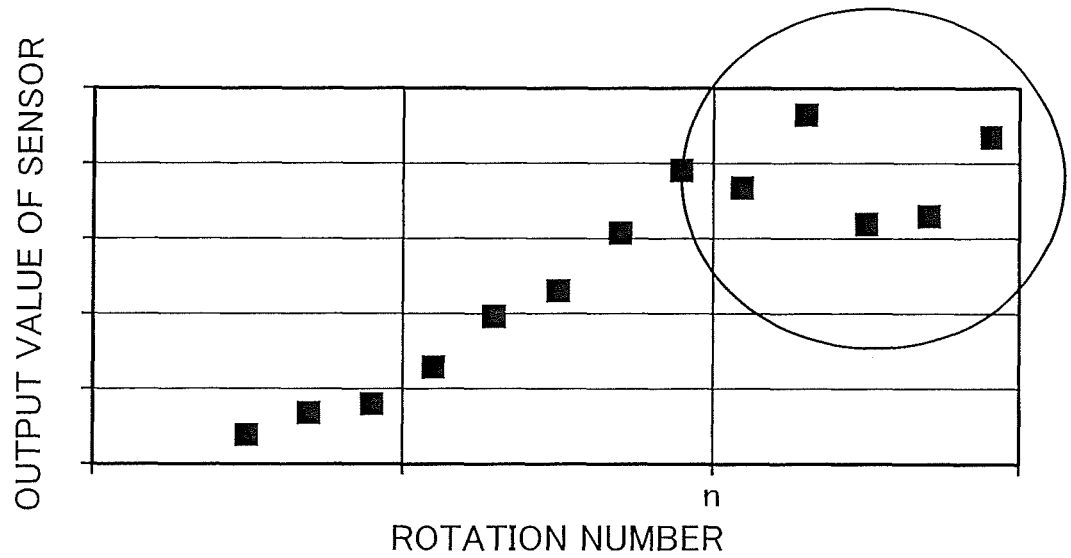
FIG. 8 is a graph showing a relationship between the rotation number and the output value of a sensor.

The experiment 3 will be described. The present inventors conducted an experiment of measuring the output value of the sensor 150 while raising the rotation number of the rotation shaft 3. FIG. 8 is a graph in which the experiment results are plotted. The lateral axis of the graph represents the rotation number of the rotation shaft 3, and the longitudinal axis represents the output value of the sensor 150. An experiment result of one of the two sensors 150 is plotted, and plotting of the experiment result of the other one is omitted. When the rotation number of the rotation shaft 3 increases, the output value of the sensor 150 increases; however, a cavitation occurred when the rotation number of the rotation shaft 3 exceeded a predetermined value n. It has been found out that the output value of the sensor 150 fluctuates up and down when the rotation number of the rotation shaft 3 exceeds the predetermined value n.

From the above, the aforementioned four types of abnormality can be discriminated by monitoring the output values of the two sensors 150. FIGS. 9 to 12 are graphs for describing the discrimination of the four types of abnormality. In these graphs, the lateral axis represents the elapsed time, and the longitudinal axis represents the output value of the sensor 150. In the graphs, the output waveform W1 of the sensor 150-1 and the output waveform W2 of the sensor 150-2 are shown.

A range R of the output value of the sensor 150 is defined in advance. Within the range R, none of the four types of abnormality occurs. An upper limit of the range R is defined as an upper limit value UV, and a lower limit of the range R is defined as a lower limit value LV. In FIGS. 9 to 12, the range R assumes the same value; the upper limit value UV is the same value; and the lower limit value LV is the same value.

Figure 9:
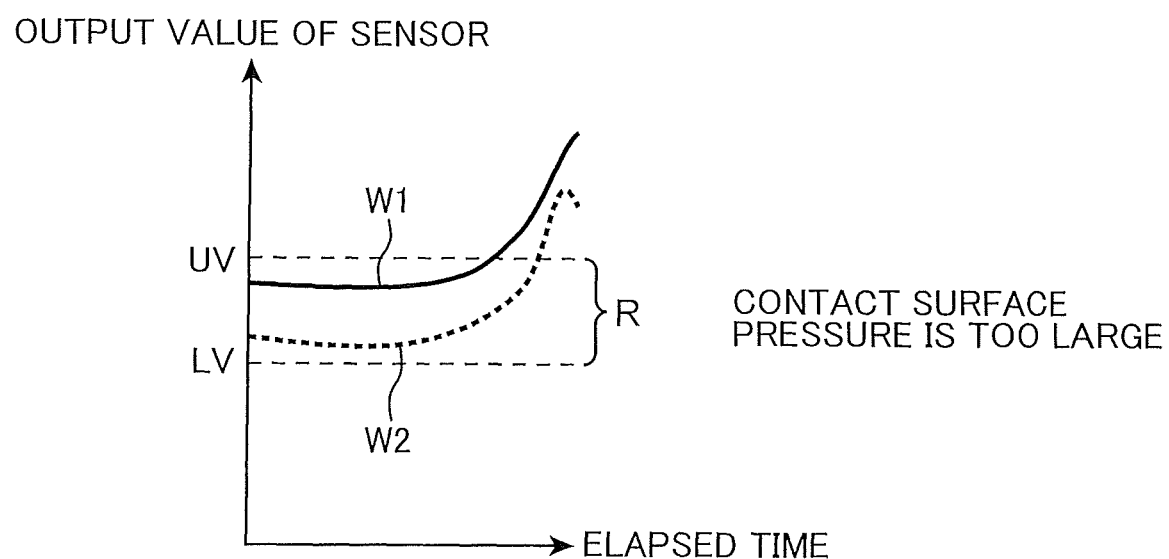
FIG. 9 is a graph showing a relationship between the elapsed time and the output value of a sensor when the contact surface pressure is too large.

With reference to FIG. 9, when the output value of the sensor 150-1 and the output value of the sensor 150-2 are above the upper limit value UV at the same timing, this means the case in which the contact surface pressure between the rotary blades 21 and the die surface 61 is too large.

Figure 10:
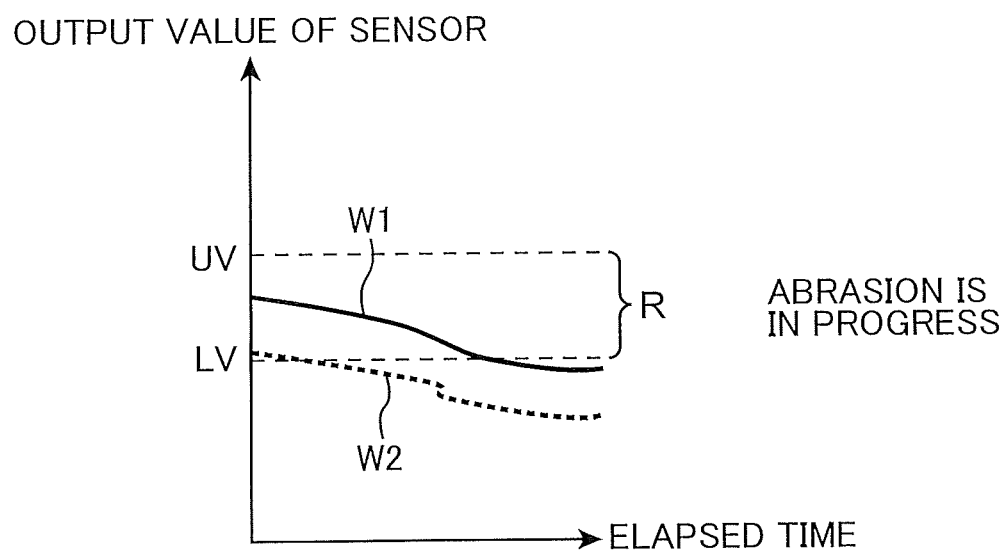
FIG. 10 is a graph showing a relationship between the elapsed time and the output value of a sensor when abrasion is in progress.

With reference to FIG. 10, when the output value of the sensor 150-1 and the output value of the sensor 150-2 are below the lower limit value LV at the same timing, this means the case in which abrasion of at least one of the rotary blades 21 and the die surface 61 has progressed.

Figure 11:
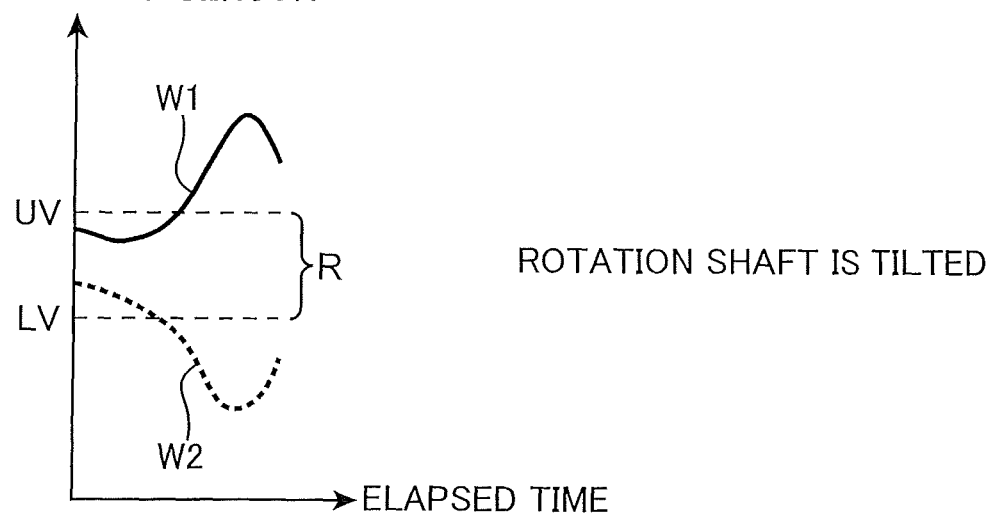
FIG. 11 is a graph showing a relationship between the elapsed time and the output value of a sensor when the rotation shaft is tilted.

With reference to FIG. 11, when the output value of one of the two sensors 150 is above the upper limit value UV and the output value of the other one of the two sensors 150 is below the lower limit value LV both at the same timing, this means that the rotation shaft 3 is tilted.

Figure 12:
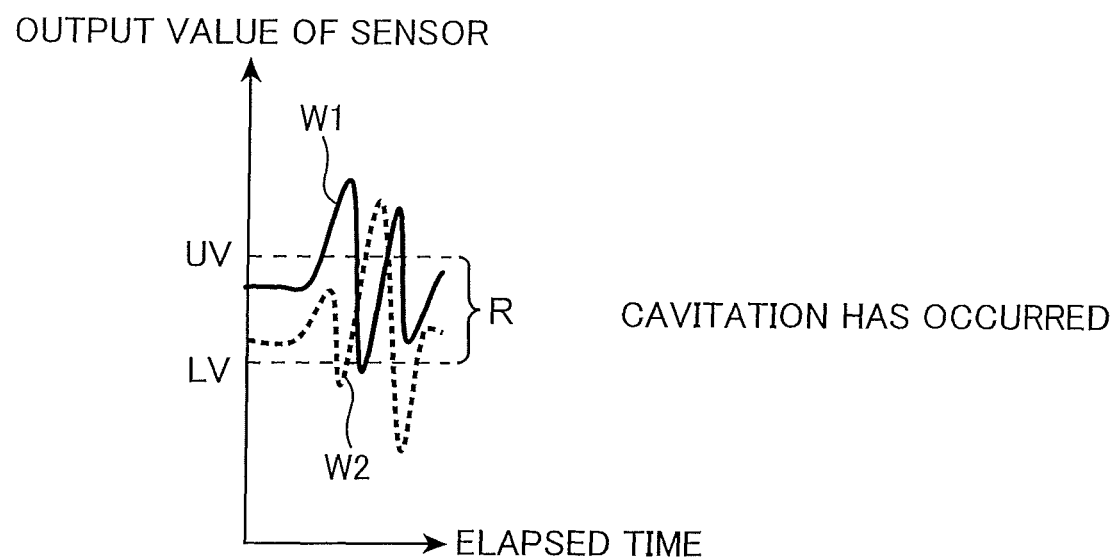
FIG. 12 is a graph showing a relationship between the elapsed time and the output value of a sensor when a cavitation has occurred.

With reference to FIG. 12, when both of a case in which the output value of the sensor 150-1 is above the upper limit value UV and a case in which the output value of the sensor 150-1 is below the lower limit value LV have occurred within a predetermined period of time and when both of a case in which the output of the sensor 150-2 is above the upper limit value UV and a case in which the output of the sensor 150-2 is below the lower limit value LV have occurred within the above predetermined period of time, this means that cavitation has occurred.

Figure 13:
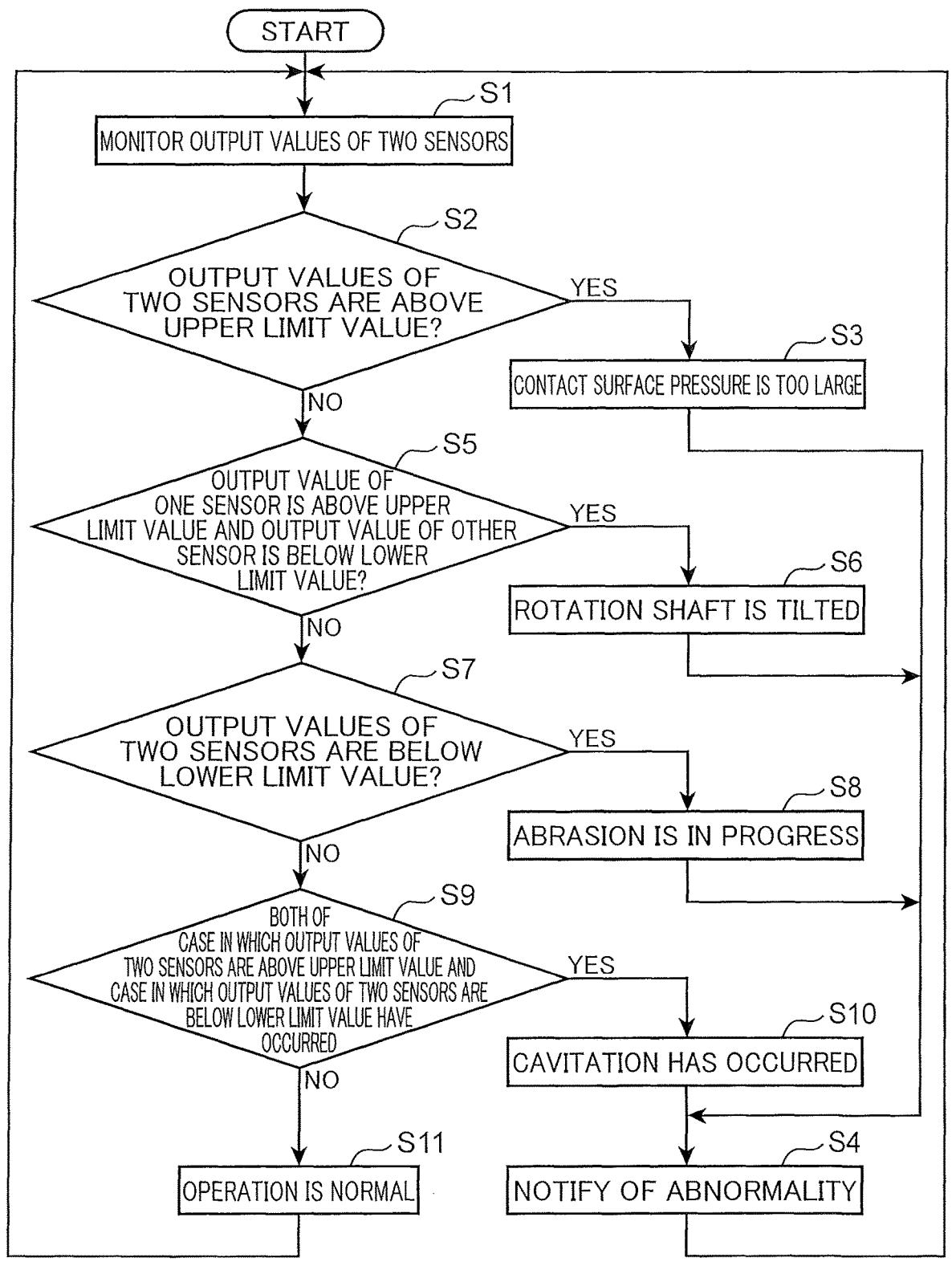
FIG. 13 is a flowchart describing a process of discriminating and determining four types of abnormality in a resin pelletizer apparatus according to the present embodiment.

FIG. 13 is a flowchart describing a process of discriminating and determining the four types of abnormality in the resin pelletizer apparatus 100 according to the present embodiment. With reference to FIGS. 1 and 13, during the operation of the resin pelletizer apparatus 100, the determination unit 121 monitors the output values of the two sensors 150 (step S1).

The determination unit 121 determines whether or not it is established that the output values of the two sensors 150 are above the upper limit value UV at the same timing (step S2). When the determination unit 121 determines that this is established (Yes in step S2), the determination unit 121 determines that the contact surface pressure between the rotary blades 21 and the die surface 61 is too large (step S3). This allows the notification unit 140 to notify that the contact surface pressure is too large (step S4). After the step S4, the determination unit 121 performs the processes of the step S1 and monitors the output values of the two sensors 150.

When the determination unit 121 determines that it is not established that the output values of the two sensors 150 are above the upper limit value UV at the same timing (No in step S2), the determination unit 121 determines whether or not it is established that both of a case in which the output value of one of the sensors 150 is above the upper limit value UV and a case in which the output value of the other one of the sensors 150 is below the lower limit value LV have occurred at the same timing (step S5). When the determination unit 121 determines that this is established (Yes in step S5), the determination unit 121 determines that the rotation shaft 3 is tilted (step S6). This allows the notification unit 140 to notify that the rotation shaft 3 is tilted (step S4).

When the determination unit 121 determines that it is not established that both of a case in which the output value of one of the sensors 150 is above the upper limit value UV and a case in which the output value of the other one of the sensors 150 is below the lower limit value LV have occurred at the same timing (No in step S5), the determination unit 121 determines whether or not it is established that the output values of the two sensors 150 are below the lower limit value LV at the same timing (step S7). When the determination unit 121 determines that this is established (Yes in step S7), the determination unit 121 determines that abrasion of at least one of the rotary blades 21 and the die surface 61 is in progress (step S8). This allows the notification unit 140 to notify that the abrasion of at least one of the rotary blades 21 and the die surface 61 is in progress (step S4).

When the determination unit 121 determines that it is not established that the output values of the two sensors 150 are below the lower limit value LV at the same timing (No in step S7), the determination unit 121 determines whether or not it is established that both of a case in which the output values of the two sensors 150 are above the upper limit value UV and a case in which the output values of the two sensors 150 are below the lower limit value LV have occurred within a predetermined period of time (step S9). When the determination unit 121 determines that this is established (Yes in step S9), the determination unit 121 determines that a cavitation has occurred (step S10). This allows the notification unit 140 to notify that the cavitation has occurred (step S4).

When the determination unit 121 determines that it is not established that both of a case in which the output values of the two sensors 150 are above the upper limit value UV and a case in which the output values of the two sensors 150 are below the lower limit value LV have occurred within a predetermined period of time (No in step S9), the determination unit 121 determines that the resin pelletizer apparatus 100 is in normal operation and returns to the process of the step S1.

In the present embodiment, even when the determination unit 121 determines an abnormality (steps S3, S6, S8, and S10), the control unit 120 does not stop the operation of the resin pelletizer apparatus 100, but the notification unit 140 notifies the user of the abnormality (step S4), and the determination unit 121 continues monitoring the output values of the two sensors 150 (step S1). However, the present invention is not limited to this alone, so that, when the determination unit 121 determines an abnormality (steps S3, S6, S8, and S10), the control unit 120 may stop the operation of the resin pelletizer apparatus 100, and the notification unit 140 may notify the user of the abnormality (step S4).

The countermeasures for eliminating the abnormality differ in accordance with the above-described four types of abnormality. Therefore, it is important to differentiate the four types of abnormality. As described above, according to the resin pelletizer apparatus 100 of the present embodiment, it is possible to discriminate and determine the four types of abnormality.

In the present embodiment, four types of abnormality are discriminated and determined; however, among the four types of abnormality, it is possible to adopt a mode in which three types of abnormality are discriminated and determined, a mode in which two types of abnormality are discriminated and determined, or a mode in which only one type of abnormality is determined. For example, the determination unit 121 does not determine the occurrence of cavitation but discriminates and determines the other three types of abnormality. For example, the determination unit 121 does not determine the occurrence of cavitation or the progress of abrasion but discriminates and determines the other two types of abnormality. For example, the determination unit 121 determines only the occurrence of cavitation.

In the present embodiment, description has been given by raising two sensors 150 as an example of the plurality of sensors 150; however, it is possible to adopt a mode in which the abnormality is determined by using three or more sensors 150. In the mode in which three or more sensors 150 are used, the phrase "two sensors 150" is replaced with the phrase "three or more sensors 150".

For determination of whether or not the rotation shaft 3 is tilted (step S5), two sensors 150 are needed (FIG. 11); however, the other types of abnormality can be determined with use of one sensor 150. Accordingly, in a mode in which the determination of whether or not the rotation shaft 3 is tilted is not made, the determination unit 121 determines the abnormality with use of the output value of one sensor 150.

Summary of Embodiments

A resin pelletizer apparatus according to the first aspect of the present embodiment includes a die that has a die surface having a die hole formed therein; a rotary blade that cuts a resin extruded from the die hole into a pellet shape in water when being rotated on the die surface in the water; a sensor that detects elastic waves generated by the rotary blade during rotation on the die surface; and a determination unit that monitors an output value of the sensor and determines that an abnormality has occurred when the output value of the sensor is outside a predetermined range.

During the operation of the resin pelletizer apparatus, the rotary blade is rotating while being in contact with the die surface. The present inventors have found out that an abnormality giving rise to a cause of poor cutting occurs when the magnitude of the elastic waves generated during this rotation is outside a predetermined range. The resin pelletizer apparatus according to the first aspect of the present embodiment includes a sensor that detects elastic waves generated by the rotary blade during rotation on the die surface and a determination unit that determines that an abnormality has occurred when the output value of the sensor is outside a predetermined range, so that it can be determined that an abnormality giving rise to a cause of poor cutting has occurred.

The determination unit can determine the following abnormality.

The determination unit determines that a contact surface pressure between the rotary blade and the die surface is too large when the output value of the sensor is above an upper limit value of the predetermined range. The contact surface pressure is a pressure by which the rotary blade is pressed onto the die surface. The state that "the contact surface pressure is too large" means that the contact surface pressure is greater than or equal to a predetermined value as compared with a standard value of the contact surface pressure.

The determination unit determines that an abrasion of at least one of the rotary blade and the die surface is in progress when the output value of the sensor is below a lower limit value of the predetermined range. The state that "an abrasion is in progress" means that the abrasion amount of the rotary blade or the abrasion amount of the die surface exceeds a predetermined value.

The determination unit determines that a cavitation has occurred when both of a case in which the output value of the sensor is above an upper limit value of the predetermined range and a case in which the output value of the sensor is below a lower limit value of the predetermined range have occurred within a predetermined period of time.

The resin pelletizer apparatus further includes a rotation shaft that drives the rotary blade and a plurality of the sensors that are disposed to be spaced apart from each other, wherein the determination unit determines that the rotation shaft is tilted when, among the plurality of the sensors, the output values of a part of the sensors are above an upper limit value of the predetermined range and the output values of a rest of the sensors are below a lower limit value of the predetermined range.

In the above configuration, the resin pelletizer apparatus further includes a rotation shaft that drives the rotary blade and a plurality of the sensors that are disposed to be spaced apart from each other, wherein the determination unit determines that a contact surface pressure between the rotary blade and the die surface is too large when the output values of the plurality of the sensors are each above an upper limit value of the predetermined range; the determination unit determines that an abrasion of at least one of the rotary blade and the die surface is in progress when the output values of the plurality of the sensors are each below a lower limit value of the predetermined range; the determination unit determines that a cavitation has occurred when both of a case in which the output values of the plurality of the sensors are each above an upper limit value of the predetermined range and a case in which the output values of the plurality of the sensors are each below a lower limit value of the predetermined range have occurred within a predetermined period of time; and the determination unit determines that the rotation shaft is tilted when, among the plurality of the sensors, the output values of a part of the sensors are above an upper limit value of the predetermined range and the output values of a rest of the sensors are below a lower limit value of the predetermined range.

The countermeasures for eliminating the abnormality differ in accordance with the above-described four types of abnormality. Therefore, it is important to differentiate the four types of abnormality. According to this configuration, it is possible to discriminate and determine the four types of abnormality.

An abnormality determination method for a resin pelletizer apparatus according to the second aspect of the present embodiment is a method for determining that an abnormality has occurred in the resin pelletizer apparatus including a die that has a die surface having a die hole formed therein and a rotary blade that cuts a resin extruded from the die hole into a pellet shape in water when being rotated on the die surface in the water, the method including: a first step of detecting elastic waves generated by the rotary blade during rotation on the die surface; and a second step of monitoring a magnitude of the elastic waves detected in the first step and determining that an abnormality has occurred when the magnitude of the elastic waves is outside a predetermined range.

The abnormality determination method for a resin pelletizer apparatus according to the second aspect of the present embodiment defines the resin pelletizer apparatus according to the first aspect of the present embodiment from the viewpoint of an abnormality determination method, and produces the same functions and effects as the resin pelletizer apparatus according to the first aspect of the present embodiment.

This application is based on Japanese Patent Application No. 2016-116313 filed on Jun. 10, 2016, the entire contents of which are incorporated in the present application.

The present invention has been suitably and fully described by way of embodiments with reference to the drawings in the above description so as to express the present invention; however, it is to be recognized that those skilled in the art can easily change and/or modify the above-described embodiments. Therefore, it is interpreted that, unless the changes or modifications made by those skilled in the art are at a level that departs from the scope of the rights of the claims described in the claims section, those changes or modifications are all comprised within the scope of the rights of the claims.

INDUSTRIAL APPLICABILITY

The present invention can provide a resin pelletizer apparatus and an abnormality determination method for a resin pelletizer apparatus.

The invention claimed is:
1. A resin pelletizer apparatus comprising:
   a die that has a die surface having a die hole formed therein;
   a rotary blade that cuts a resin extruded from the die hole into a pellet shape in water when being rotated on the die surface in the water;
   a sensor that detects elastic waves generated by the rotary blade during rotation on the die surface;
   a determination unit that monitors an output value of the sensor and determines that an abnormality has occurred when the output value of the sensor is outside a predetermined range;
   a rotation shaft that drives the rotary blade; and
   a plurality of the sensors that are disposed to be spaced apart from each other,
   wherein the determination unit determines that the rotation shaft is tilted when, among the plurality of the sensors, the output values of a part of the sensors are above an upper limit value of the predetermined range and the output values of a rest of the sensors are below a lower limit value of the predetermined range.

2. The resin pelletizer apparatus according to claim 1, wherein the determination unit determines that a contact surface pressure between the rotary blade and the die surface is too large when the output value of the sensor is above an upper limit value of the predetermined range.

3. The resin pelletizer apparatus according to claim 1, wherein the determination unit determines that an abrasion of at least one of the rotary blade and the die surface is in progress when the output value of the sensor is below a lower limit value of the predetermined range.

4. The resin pelletizer apparatus according to claim 1, wherein the determination unit determines that a cavitation has occurred when both of a case in which the output value of the sensor is above an upper limit value of the predetermined range and a case in which the output value of the sensor is below a lower limit value of the predetermined range have occurred within a predetermined period of time.

5. A resin pelletizer apparatus comprising:
- a die that has a die surface having a die hole formed therein;
- a rotary blade that cuts a resin extruded from the die hole into a pellet shape in water when being rotated on the die surface in the water;
- a sensor that detects elastic waves generated by the rotary blade during rotation on the die surface;
- a determination unit that monitors an output value of the sensor and determines that an abnormality has occurred when the output value of the sensor is outside a predetermined range;
- a rotation shaft that drives the rotary blade; and
- a plurality of the sensors that are disposed to be spaced apart from each other, wherein the determination unit determines that a contact surface pressure between the rotary blade and the die surface is too large when the output values of the plurality of the sensors are each above an upper limit value of the predetermined range, the determination unit determines that an abrasion of at least one of the rotary blade and the die surface is in progress when the output values of the plurality of the sensors are each below a lower limit value of the predetermined range, the determination unit determines that a cavitation has occurred when both of a case in which the output values of the plurality of the sensors are each above the upper limit value of the predetermined range and a case in which the output values of the plurality of the sensors are each below the lower limit value of the predetermined range have occurred within a predetermined period of time, and the determination unit determines that the rotation shaft is tilted when, among the plurality of the sensors, the output values of a part of the sensors are above the upper limit value of the predetermined range and the output values of a rest of the sensors are below the lower limit value of the predetermined range.

* * * * *